United States Patent
Endo et al.

(10) Patent No.: US 9,725,104 B2
(45) Date of Patent: Aug. 8, 2017

(54) BOARDING AND ALIGHTING SYSTEM AND NON-TRANSITORY COMPUTER-READABLE RECORDING MEDIUM

(71) Applicant: KYOCERA Document Solutions Inc., Osaka (JP)

(72) Inventors: Wataru Endo, Osaka (JP); Masaya Okuda, Osaka (JP); Akira Yuki, Osaka (JP); Daisuke Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/168,022

(22) Filed: May 28, 2016

(65) Prior Publication Data

US 2016/0347337 A1    Dec. 1, 2016

(30) Foreign Application Priority Data

May 28, 2015    (JP) .................................. 2015-108490

(51) Int. Cl.
*G08B 9/00* (2006.01)
*B61L 25/02* (2006.01)
(Continued)

(52) U.S. Cl.
CPC ............. *B61L 25/02* (2013.01); *B61L 15/009* (2013.01); *B61L 15/0027* (2013.01);
(Continued)

(58) Field of Classification Search
CPC .... B61L 15/0027; B61L 15/009; B61L 25/02; B61L 25/025; B61L 27/0022; B61L 27/0077; H04W 4/021; H04W 4/20
(Continued)

(56) References Cited

U.S. PATENT DOCUMENTS

| 8,639,439 | B2 * | 1/2014 | Lee | ..................... G01C 21/3655 |
| | | | | 701/410 |
| 2005/0080554 | A1 * | 4/2005 | Ono | ....................... G01C 21/20 |
| | | | | 701/533 |

(Continued)

FOREIGN PATENT DOCUMENTS

JP    2002-255035 A    9/2002

*Primary Examiner* — Nader Bolourchi
(74) *Attorney, Agent, or Firm* — Hawaii Patent Services; Nathaniel K. Fedde; Nathaniel N. Fedde

(57) ABSTRACT

Provided is a non-transitory computer-readable recording medium in which an information providing program is stored for causing a computer to control a mobile terminal, the information providing program causing the computer to operate as: an area information acquiring circuit acquiring area information continuously transmitted from an information transmission device which is arranged in public transportation and available only in the train, an arrival station identification information acquiring circuit acquiring arrival station identification information transmitted from the information transmission device within a specified period, an arrival station identification information comparing circuit comparing the arrival station identification information with the destination station identification information, a boarding and alighting guidance control circuit notifying that the train is approaching the detraining station when a comparison result obtained by the arrival station identification information comparing circuit is matched with each other.

7 Claims, 7 Drawing Sheets

(51) Int. Cl.
*H04W 4/20* (2009.01)
*B61L 15/00* (2006.01)
*B61L 27/00* (2006.01)
*H04W 4/02* (2009.01)

(52) U.S. Cl.
CPC ......... *B61L 25/025* (2013.01); *B61L 27/0022* (2013.01); *B61L 27/0077* (2013.01); *H04W 4/021* (2013.01); *H04W 4/20* (2013.01)

(58) Field of Classification Search
USPC .................................................. 340/286.02
See application file for complete search history.

(56) References Cited

U.S. PATENT DOCUMENTS

2007/0208502 A1* 9/2007 Sakamoto .............. G01C 21/20
701/19
2013/0317747 A1* 11/2013 Chidlovskii ............. G06N 5/02
701/540

* cited by examiner

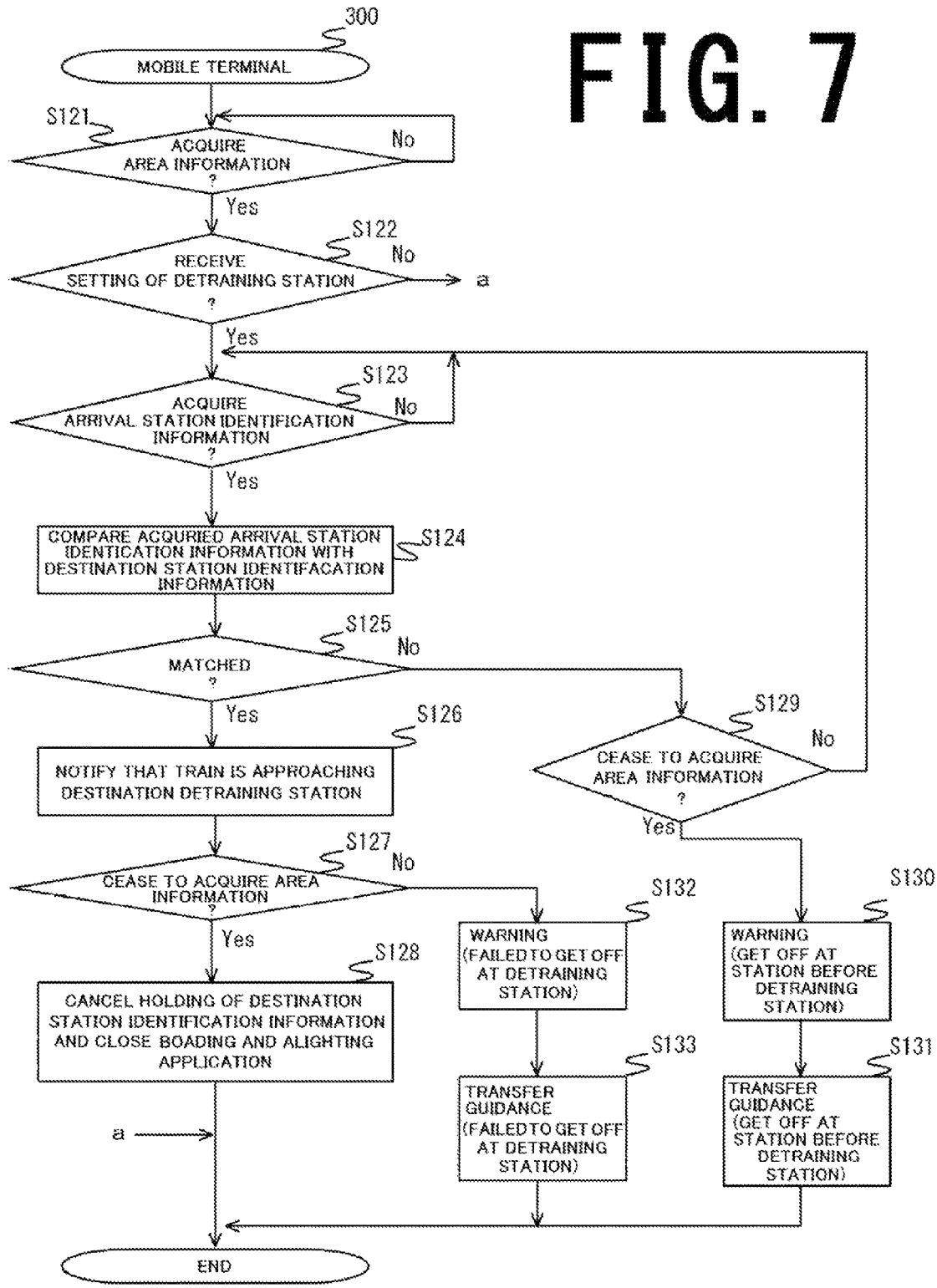

ABSTRACT# BOARDING AND ALIGHTING SYSTEM AND NON-TRANSITORY COMPUTER-READABLE RECORDING MEDIUM

INCORPORATION BY REFERENCE

This application is based on and claims the benefit of priority from Japanese Patent Application No. 2015-108490 filed on May 28, 2015, the entire contents of which are hereby incorporated by reference.

BACKGROUND

The present disclosure relates to a boarding and alighting guidance system is executed by a computer that controls a mobile terminal when the boarding and alighting guidance system provides information for a user who uses public transportation such as railroad, and to a non-transitory computer-readable recording medium in which an information providing program is stored.

It not seldom happens that a user who uses public transportation such as railroad sometimes fails to get off at a destination detraining station when the user uses the public transportation for the first time. Further, even though the user uses the public transportation on a daily basis, the user sometimes fails to get off at a destination detraining station in a case where the user concentrates on reading, in a case where the user is thinking of something else, or in a case where the user gets on a train after drinking.

Here, as an example of a technique for preventing the user from failing to get off at a destination detraining station, there has been known a boarding and alighting guidance system disclosed in a typical technique. This boarding and alighting guidance system includes an IC Card-type data transmission device for a departure station ticket gate for transmitting a departure station ID, a destination station listing device having a plurality of IC Card-type destination station ID data transmission devices for inputting a destination station ID in a cellular phone, a center device communicating with the cellular phone via wireless communication, receive a user ID, the departure station ID, and the destination station ID from the cellular phone, and causes the cellular phone to provide approaching guidance. It is to be noted that the IC Card-type data transmission device for the departure station ticket gate and the destination station listing device are provided at each station. The center device is provided at a remote position distant from the station.

Then, the center device monitors an operation status of a train and when the train approaches a destination station, causes the cellular phone to provide the approaching guidance. Also, the center device receives a name of the detraining station from the cellular phone after a passenger gets off the train. If the passenger gets off at a wrong station, the center device causes the cellular phone to give detraining station error notification and to provide right boarding and alighting guidance.

SUMMARY

According to an aspect of the present disclosure, there is provide a non-transitory computer-readable recording medium in which an information providing program is stored for causing a computer to control a mobile terminal, the information providing program causing the computer to operate as: a detraining station setting receiving circuit that receives an inputted setting of a destination detraining station and holds the setting as destination station identification information; an area information acquiring circuit that acquires area information which is continuously transmitted from an information transmission device arranged in public transportation and available only in a train; an arrival station identification information acquiring circuit that acquires arrival station identification information transmitted from the information transmission device within a specified period; an arrival station identification information comparing circuit that compares the arrival station identification information with the destination station identification information; and a boarding and alighting guidance control circuit that notifies that the train is approaching a detraining station when a comparison result obtained by the arrival station identification information comparing circuit is matched with each other, wherein when the comparison result obtained by the arrival station identification information comparing circuit does not match with each other, and the area information acquiring circuit ceases to acquire the area information, the boarding and alighting control circuit determines that a user gets off at a station other than the destination detraining station and issue a warning.

Further, according to another aspect of the present disclosure, there is provided A boarding and alighting guidance system comprising: a traffic control system that is arranged at a remote position distant from a station; an information transmission device that is arranged in a train and receives information from the traffic control system; and a mobile terminal that receives information from the information transmission device, the traffic control system including an arrival station identification information transmission control circuit that confirms an operation status of the train and transmits arrival station identification information containing train identification information for identifying an arrival station to the information transmission device when the train approaches the station, the information transmission device including an arrival station identification information transmission circuit that transmits the arrival station identification information within a specified period and an area information transmission circuit that continuously transmits area information which is available only in the train, and the mobile terminal including a detraining station setting receiving circuit that receives a destination detraining station and holds the setting as destination station identification information, an area information acquiring circuit that acquires the area information, an arrival station identification information acquiring circuit that acquires the arrival station identification information, an arrival station identification information comparison circuit that compares the arrival station identification information with the destination station identification information, and a boarding and alighting guidance control circuit that notifies that the train is approaching the destination detraining station when a comparison obtained by the arrival station identification information comparison circuit is matched with each other, wherein the boarding and alighting guidance control circuit determines that the user gets off at a station other than the destination detraining station and issue a warning when the comparison result obtained by the arrival station identification information comparison circuit does not match with each other, and when the area information acquiring circuit ceases to acquire the area information.

BRIEF DESCRIPTION OF THE DRAWINGS

FIG. 7 shows steps of an information providing processing by the mobile terminal shown in FIG. 1.

DETAILED DESCRIPTION

Figure 1:
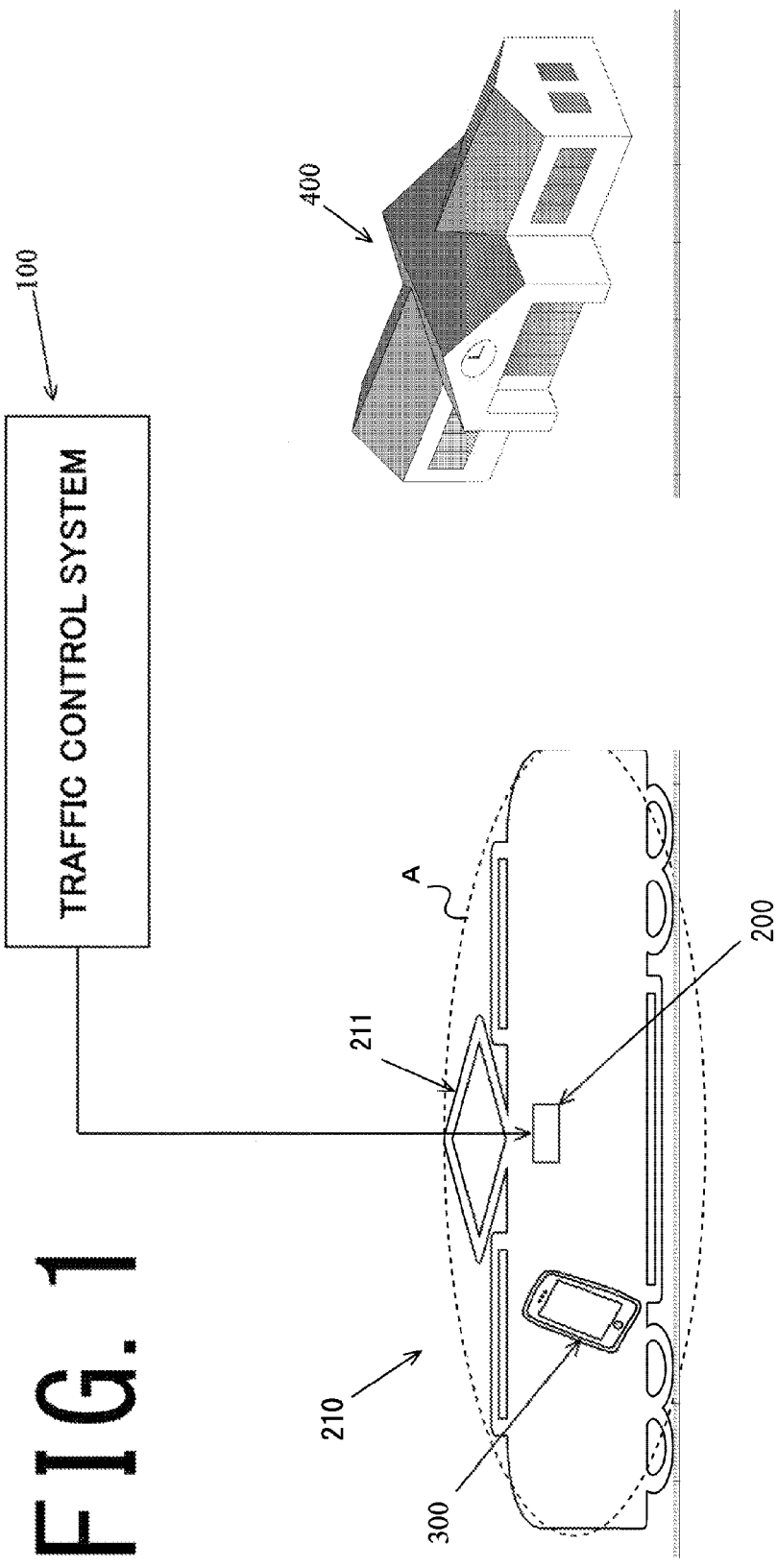
FIG. 1 shows an example of a boarding and alighting guidance system to which an information providing program according to one exemplary embodiment of the present disclosure is applied.

Hereinafter, a description will be made to one embodiment of an information providing program according to the present disclosure with reference to FIG. 1 through FIG. 5. In the present exemplary embodiment, the description will be made by taking a case of public transportation as an example. FIG. 1 is a view showing an example of a boarding and alighting guidance system to which the information providing program according to the present disclosure is applied. As shown in FIG. 1, a boarding and alighting guidance system includes a traffic control system 100, an information transmission device 200, and a mobile terminal 300. In this connection, a reference numeral 400 designates a station at and from which a train arrives and departs.

The traffic control system 100 is arranged at a remote position distant from the station 400. The traffic control system 100 monitors an operation status of a train 210 and transmits arrival station identification information containing train identification information for identifying an arrival station to the information transmission device 200 when the train 210 approaches the station 400. Whether the train approaches the station 400 or not can be determined, for example, by contact of a pantograph 211 on the train 210 with a switch that is usually mounted on a stringing. It is to be noted that the transmission of the arrival station identification information containing train identification information from the traffic control system 100 to the information transmission device 200 may be performed either via wired or wireless communication.

Figure 2:
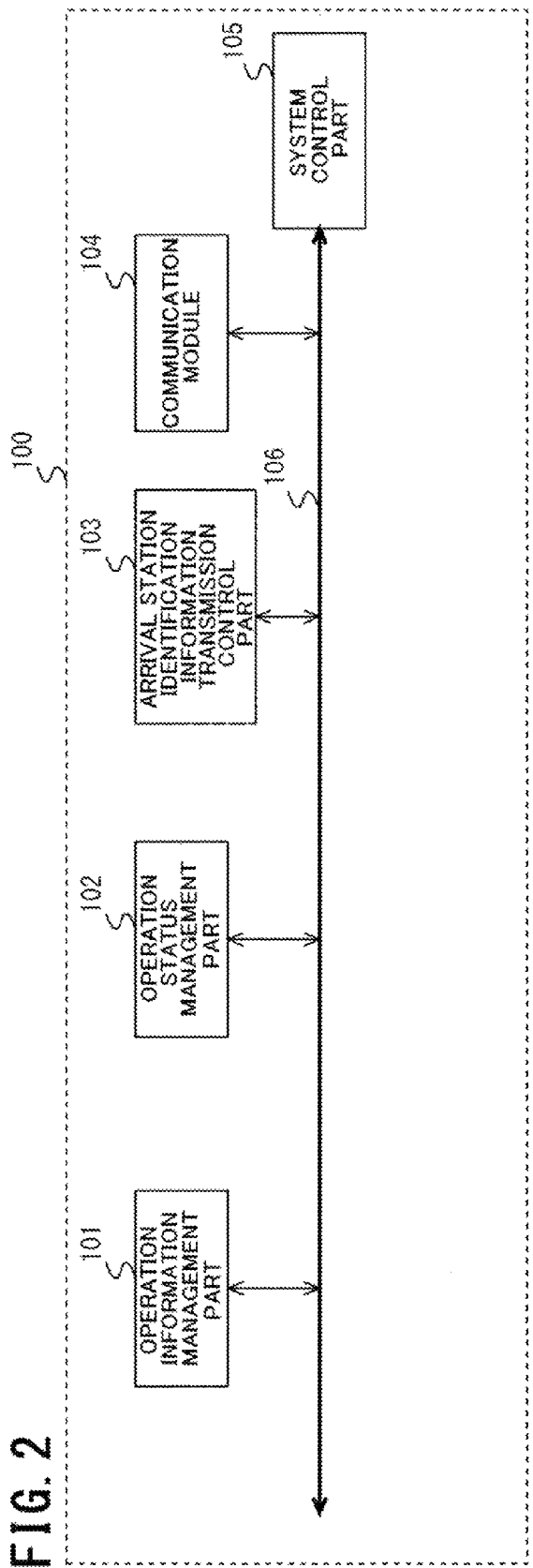
FIG. 2 shows an example of an inner configuration of the traffic control system shown in FIG. 1.

In other words, as shown in FIG. 2, the traffic control system 100 includes, an operation information management part 101, an operation status management part 102, an arrival station identification information transmission control part 103, a communication module 104, and a system control part 105. They are connected with one another byway of a transmission channel 106. The operation information management part 101, the operation status management part 102, the arrival station identification information transmission control part 103, the communication module 104, and the system control part 105 includes a processor such as a Central Processing Unit (CPU) having one or more circuits. Here, the circuit may be an electronic part in which plural electronic elements are interconnected by wiring or electronic substrate. The circuit is also capable of reading and executing various programs and of executing previously embedded various programs.

The traffic control part 101 controls a schedule of each of the train 210. The operation status control part 102 manages train identification information for identifying each of the train 210, departure station information, stopover station information, terminal station information, and so on. In this connection, the departure station information, the stopover station information, and the terminal station information can be known by referring to the operation schedule managed by the traffic information control part 101.

The operation status control part 102 also manages a current position of each of the train 210. In other words, the operation status control part 102 also manages that where the train 210 is passing through between which stations 400, which station the train is approaching, at which station the train 210 is stopping, and from which station the train 210 now departed. In this connection, which station the train is approaching can be confirmed, for example, by the contact of the pantograph 211 on the train 210 with the switch that is usually mounted on the stringing, as mentioned above.

When the arrival station identification information transmission control part 10 confirms that each of the train 210 is approaching the station 400, the arrival station identification information transmission control part 10 transmits arrival station identification information containing train identification information indicating the approaching station 400 from the communication module 104. It is to be noted that when confirms that each of plural trains 210 are approaching different stations 400, the arrival station identification information transmission control part 103 transmits arrival station identification information containing plural train identification information indicating approaching each of the stations 400 from the communication module 104.

The communication module 104 transmits the arrival station identification information containing the train identification information via wired or wireless communication to the information transmission device 200 in the train 210. The system control part 105 controls cooperative operations of the operation information management part 101, the operation status management part 102, the arrival station identification information transmission control part 103, and the communication module 104.

The information transmission device 200 is arranged in the train 21. Here, although only one train is illustrated in FIG. 1, in a case where plural trains are connected to one after another, the information transmission device 200 is arranged in each of the trains. The information transmission device 200 selects and transmits the arrival station identification information from the traffic control system 100 using a weak ultrasonic sound or a radio wave as a medium.

The information transmission device 200 constantly transmits area information to a mobile terminal 300 to be detailed later using the weak ultrasonic sound or the radio wave as a medium. This area information indicates an area between which the arrival station identification information is transmitted. Further, the arrival station identification information and the area information transmitted from the information transmission device 200 are transmitted within a transmission area A covering a car of the train as shown by dotted lines. In other words, the transmission area A is limited in only car of the train. In this connection, a frequency band of the ultrasonic sound may be a band other than the audible band (20 to 20,000 Hz), not to give user unpleasant feelings.

The transmission of the arrival station identification information from the information transmission device 200 is performed within a specified period. Here, the specified period is defined as a time range from a time when the information transmission device 200 receives the station identification information from the traffic control system 100 to a time when the train 210 departs from the station at which the train arrived. Instead, as a candidate of the departure time of the train 210, for example, it may be possible to be a time when the train 210 stopped at the station 400 at which the train 210 arrived begins to move (actually departed). Alternatively, as a candidate of the departure time of the train 210, for example, it may be possible to be a time when a closing operation of the door of the train 210 is detected which is opened at the arrival station 400.

Figure 3:
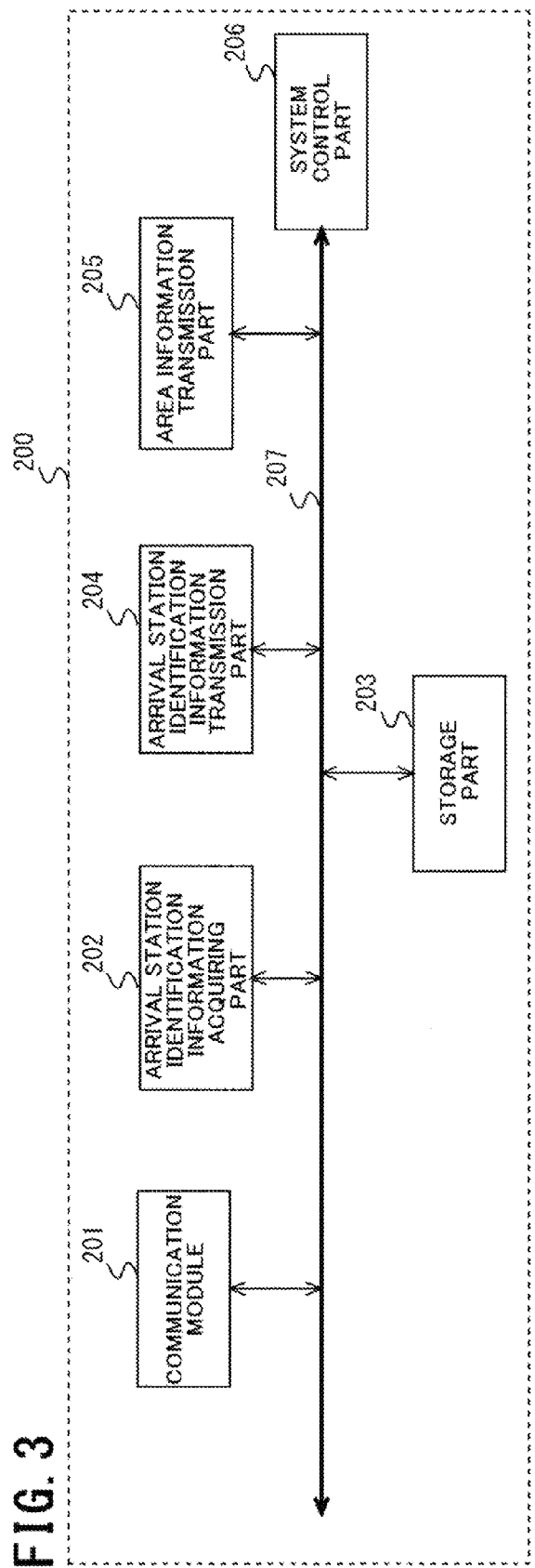
FIG. 3 shows an example of an inner configuration of an information transmission device shown in FIG. 1.

In other words, the information transmission device 200 includes, as shown in FIG. 3, a communication module 201, an arrival station identification information acquiring part 202, a storage part 203, an arrival station identification information transmission part 204, an area information transmission part 205, and a system control part 206. They are connected with one another by way of a data bus 207. The communication module 201, the arrival station identification information acquiring part 202, the arrival station identification information transmission part 204, the area information transmission part 205, and the system control part 206 includes a processor such as a CPU (Central Processing Unit) having one or more circuits. Here, the circuit may be an electronic part in which plural electronic elements are interconnected by wiring or electronic substrate. The circuit is capable of reading and executing various programs or executing previously embedded various programs. The storage part 203 is a memory having a region in which various data and various programs are stored.

The communication module 201 receives the arrival station identification information containing the train identification information transmitted from the traffic control part 100. The arrival station identification information acquiring part 202 acquires the arrival station identification information (selects the arrival station identification information) based on the train identification information stored in the storage part 203. In the storage part 203, the train identification information for identifying the train 210 is stored.

The arrival station identification information transmission part 204 transmits the arrival station identification information acquired by the arrival station identification information acquiring part 202 within the above-mentioned specified period. The area information transmission part 205 constantly transmits the above-mentioned area information. In this connection, the reason why the area information is constantly transmitted is described later. The system control part 206 controls cooperative operations of the communication module 201, the arrival station identification information acquiring part 202, the arrival station identification information transmission part 204, and the area information transmission part 205.

The mobile terminal 300 is carried by a user in the train. Previously installing a boarding and alighting guidance application in the mobile terminal 300 supports the mobile terminal 300 to provide guidance for a destination detraining station.

Figure 4:
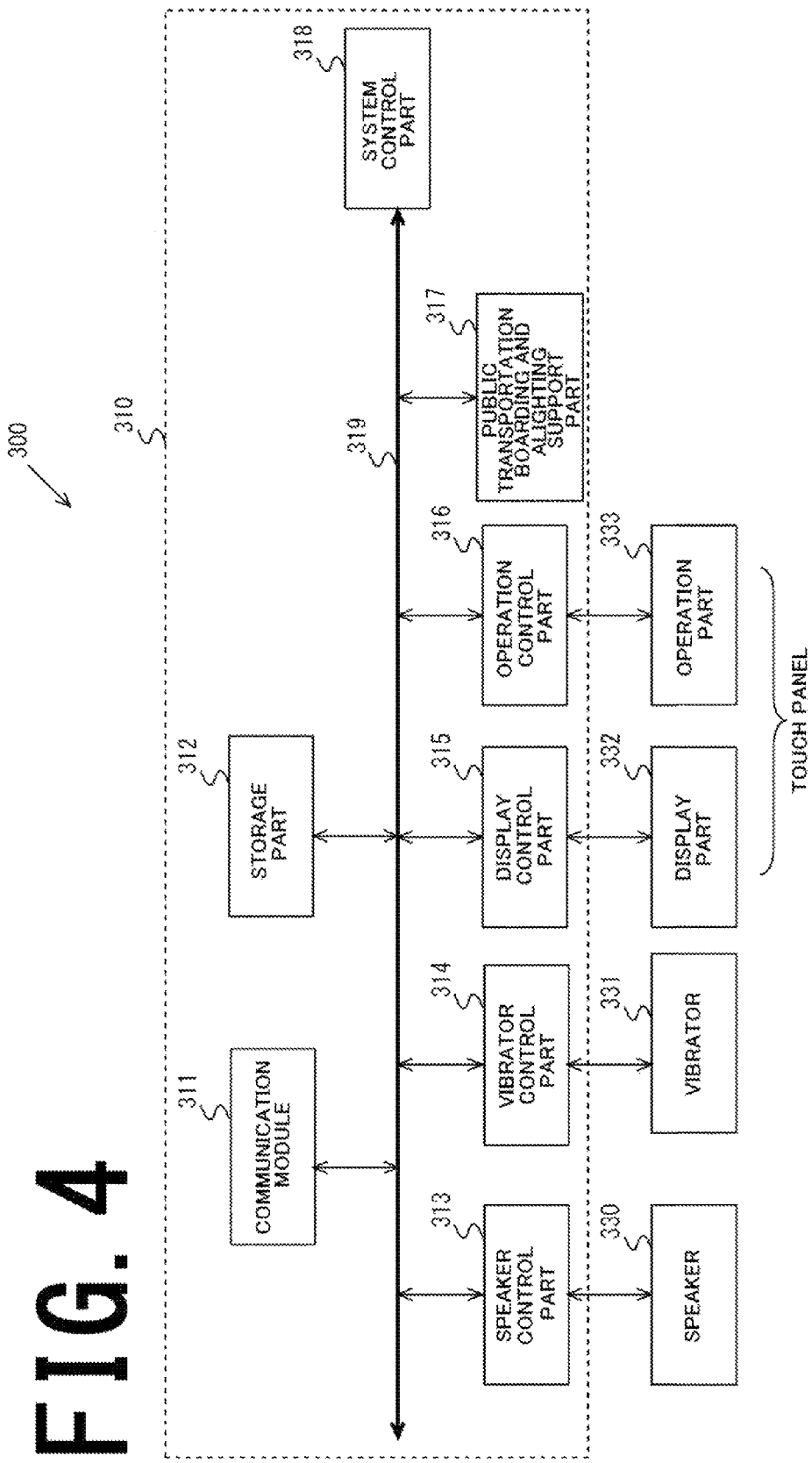
FIG. 4 shows an example of a configuration of a mobile terminal shown in FIG. 1.

In other words, the mobile terminal 300 includes, as shown in FIG. 4, a control part 310, a speaker 330, a vibrator 331, a display part 332, and an operation part 333.

The control part 310 has one or more processors and includes a communication module 311, a storage part 312, a speaker control part 313, a vibrator control part 314, a display control part 315, an operation control part 316, a public transportation boarding and alighting support part 317, and a system control part 318. They are connected with one another by way of a data bus 319. The communication module 311, the storage part 312, the speaker control part 313, the vibrator control part 314, the display control part 315, the operation control part 316, the public transportation boarding and alighting support part 317, and the system control part 318 include a processor such as a CPU (Central Processing Unit) having one or more circuits. Here, the circuit may be an electronic part in which plural electronic elements are interconnected by wiring or electronic substrate. The circuit is capable of reading and executing various programs and of executing previously embedded various programs. The storage part 312 is a memory having a region in which various data and various programs are stored.

The communication module 311 receives the arrival station identification information and the area information transmitted from the information transmission device 200. In the storage part 312, programs necessary for an operation of the system control part 318 are stored. The speaker control part 313 controls an audio output operation of the speaker 330. The vibrator control part 314 controls a vibrating motion of a vibrator 331. The display control part 315 controls a display operation of the display part 332. The operation control part 316 controls an operation conducted by the operation part 333. Here, the display part 332 and the operation part 333 are consisted of a touch panel.

Although the details of the public transportation boarding and alighting support part 317 are to be described later, the public transportation boarding and alighting support part 317 is operated by the boarding and alighting guidance application installed in the mobile terminal 300. The system control part 318 controls cooperative operations of the above-mentioned parts.

Figure 5:
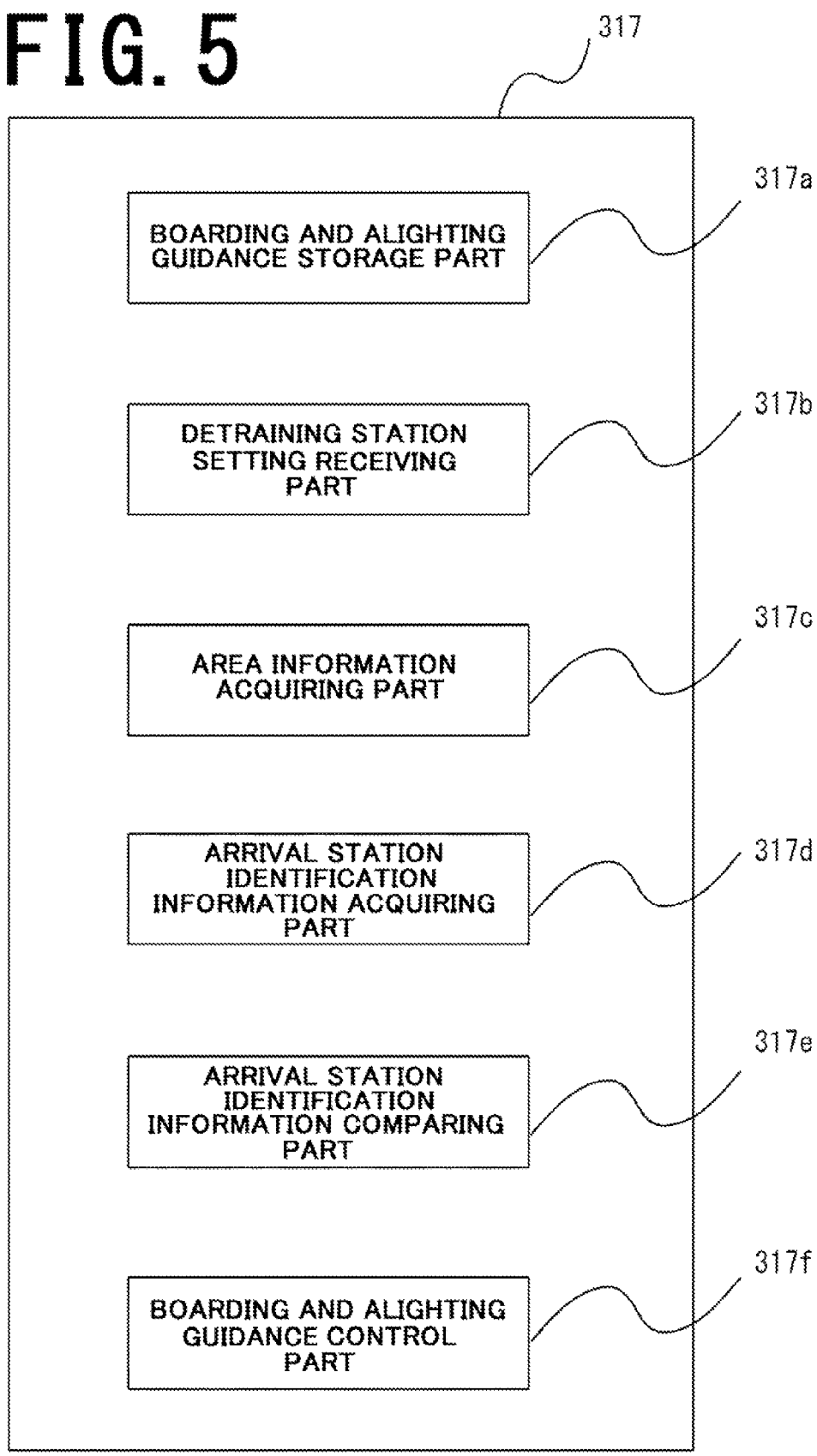
FIG. 5 shows a configuration of a public transportation boarding and alighting support part shown in FIG. 4.

Next, an example of a configuration of the public transportation boarding and alighting support part 317 will be described with reference to FIG. 5. The public transportation boarding and alighting support part 317 includes a boarding and alighting guidance storage part 317a, a detraining station setting receiving part 317b, an area information acquiring part 317c, an arrival station identification information acquiring part 317d, arrival station identification information comparing part 317e, and a boarding and alighting guidance control part 317f.

In the boarding and alighting guidance storage part 317a, route maps of various routes and station identification information for each of the station 400. The detraining station setting receiving part 317b receives a setting of a destination detraining station inputted via the display part 332 and holds the setting as destination station identification information. In this connection, when the destination detraining station is set, the above-mentioned touch panel consisted of the display part 332 and the operation part 333 is operated to invoke a boarding and alighting guidance application. Invoking the boarding and alighting guidance application displays the route maps or items to input a departure station and a detraining station on the touch panel.

The detraining station setting receiving part 317b receives a setting of the destination detraining station by selecting the destination detraining station from the route maps or inputting the departure station and the detraining station into the items. When the setting of the destination detraining station is received, the mobile terminal 300 transits to a power saving mode such as a stand-by mode or a sleep mode. In this connection, the mode transition of the mobile terminal 300 can be made by the boarding and alighting guidance control part 317f. Further, the mode transition of the mobile terminal 300 follows the setting by a user. The transition to the power saving mode after the setting of the destination detraining station is received allows further suppression of the unnecessary power consumption.

Alternatively, the invocation of the boarding and alighting application and the setting of the destination detraining station may be inputted by a voice through a microphone.

The area information acquiring part 317c acquires the area information constantly transmitted from the information transmission device 200. The arrival station identification information acquiring part 317d acquires the arrival station identification information transmitted from the information transmission device 200. The arrival station identification comparison part 317e compares the arrival station identification information acquired by the arrival station identification information acquiring part 317d with the destination station identification information held by the detraining setting receiving part 317b.

When the area information acquiring part 317c acquires the area information constantly transmitted from the information transmission device 200, the boarding and alighting guidance control part 317f recognizes the transmission area A. Further, when a comparison result obtained by the arrival station identification comparison part 317e is matched with each other, the boarding and alighting guidance control part 317f notifies the comparison result through anyone of or any combination of the speaker 330, the vibrator 331, and the display part 332. It is to be noted whether the comparison result is notified through any one of the speaker 330, the vibrator 331, and the display part 332 or any combination thereof may be changed depending on the setting by a user. Here, in a case where the speaker 330 is selected, the speaker 330 notifies that a train is approaching the destination detraining station by a voice. Further, in a case where the vibrator 331 is selected, the vibrator 331 notifies that the train is approaching the destination detraining station by vibrations. Furthermore, in a case where the display part 332 is selected, the display part 332 notifies that the train is approaching the destination detraining station by characters or images.

When the user gets off at the destination detraining station, the detraining station setting receiving part 317b resets the setting of the destination detraining station, and then the boarding and alighting guidance control part 317f closes the boarding and alighting guidance application. In other words, when the user gets off the train 210 arrived at the destination detraining station, the user goes out of the transmission area A shown in FIG. 1. In doing so, the area information acquiring part 317c ceases to acquire the area information constantly transmitted from the information transmission device 200. In this way, the area information acquiring part 317c ceases to acquire the area information, which allows the boarding and alighting guidance control part 317f to determine that the user has got off at the destination detraining station.

When the comparison result between the station arrival identification information and the destination station identification information obtained by the arrival station identification information comparison part 317e does not match with each other and when the area information acquiring part 317c ceases to acquire the area information constantly transmitted from the information transmission device 200, the boarding and alighting control part 317f determines that the user gets off at a station other than the destination detraining station. In other words, when the user gets off the train 210 arrived at the station other than the destination detraining station, the user goes out of the transmission area A shown in FIG. 1, and the area information acquiring part 317c ceases to acquire the area information constantly transmitted from the information transmission device 200. This determines that the user gets off at the station other than the destination detraining station.

Here, as the station other than the destination detraining station, there can be two cases. That is, a case where a user gets off at a station before the destination detraining station and a case where the user gets off at a station after the destination detraining station. As to the details of whether the user gets off at the station before or after the destination detraining station will be described later. In this case, the boarding and alighting guidance control part 317f displays on the display part 332 a warning notifying that the station at which the user gets off before or after the destination detraining station is a wrong station or issues a warning by a voice from the speaker 330. Thereby, at a point in time when the user gets off the train 210 arrived at the station other than the destination detraining station, the boarding and alighting guidance control part 317f can immediately notify that the user gets off at the station other than the destination detraining station.

When the boarding and detraining guidance control part 317f determines that the user gets off at the station other than the destination detraining station, the boarding and alighting guidance control part 317f reads rout maps of various routes and the identification information of each of the station 400, and the like stored in the boarding and alighting guidance storage part 317a and displays transfer guidance on the display part 332 until the user reaches the destination detraining station. Alternatively, the transfer guidance may be provided by a voice from the speaker 330. This enables the user to confirm the transfer guidance before going out of the ticket gate of the station out of the destination detraining station, which allows the user to take an immediate action following the transfer guidance.

Figure 6:
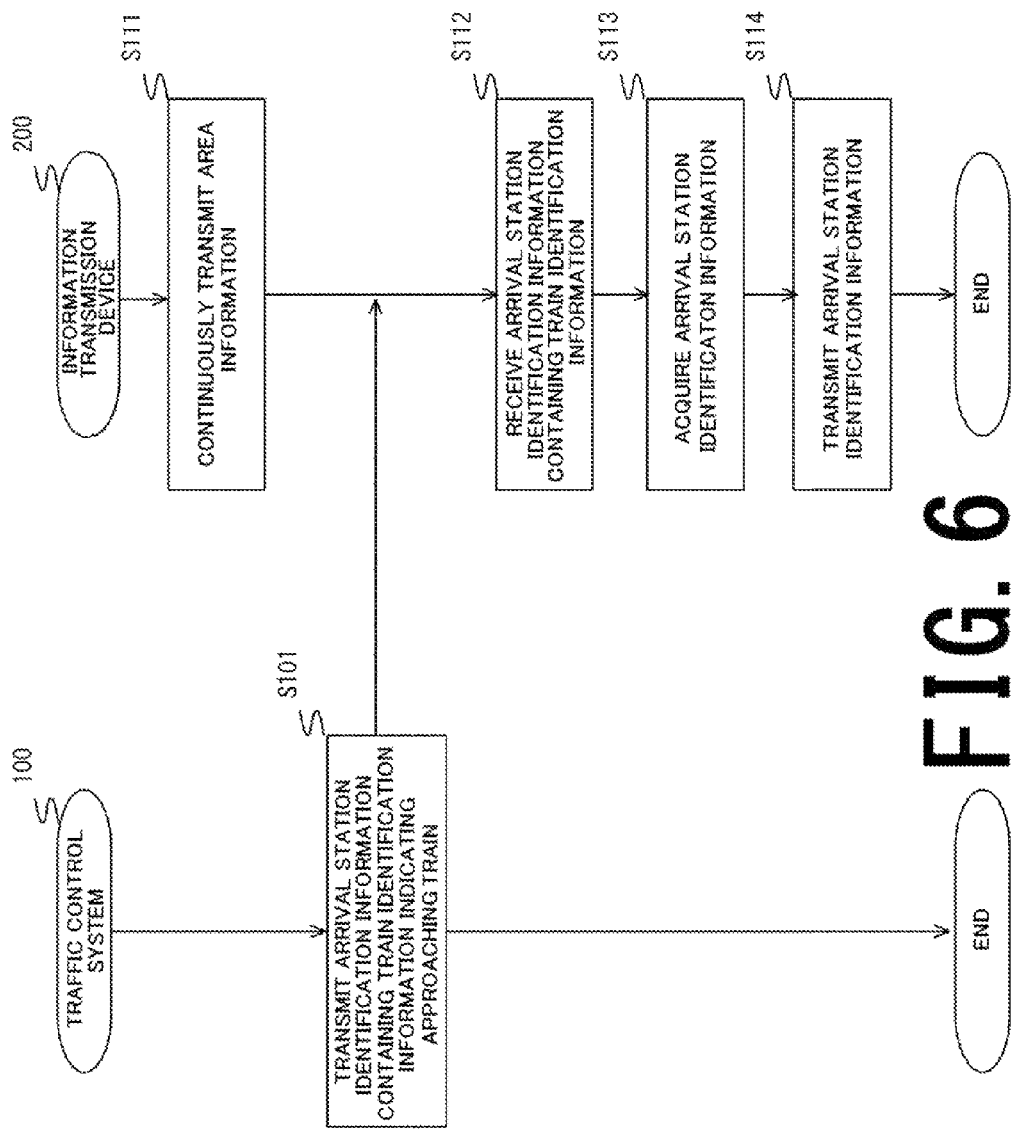
FIG. 6 shows processing steps at a traffic control system and an information transmission device side shown in FIG. 1.

Next, a description will be made to an overview of process at the traffic control system 100 and the information transmission device 200 sides with reference to FIG. 6.

(Step S111)

First of all, the area information transmission part 205 of the information transmission device 200 in the train 210 continuously transmits the area information.

(Step S101)

Herein, as described above, when the traffic control system 100 confirms that each of the train 210 is approaching the station 400, the arrival station identification transmission control part 103 of the traffic control system 100 transmits the arrival station identification information containing the train identification information indicating the approaching station 400 from the communication module 104. Here, the traffic control system 100 detects, for example, that the train 210 departs from or passes through the station at the train 210 is stopped before the station 400. By doing so, the traffic control system 100 can confirm that the train 210 is approaching the station 400. Alternatively, the traffic control system 100 may confirm that the train 210 is approaching the station 400 by detecting that a distance from the train 210 to the station 400 becomes a specific value.

(Step S112)

Further, at the information transmission device 200 side, the communication module 201 receives the arrival station identification information containing the train identification information transmitted from the traffic control system 100.

(Step S113)

Moreover, the arrival station identification information acquiring part 202 of the information transmission part 200 acquires the arrival station identification information based on the train identification information stored in the storage part 203.

(Step S114)

Then, the arrival station identification information transmission part 204 of the information transmission part 200 transmits the arrival station identification information acquired by the arrival station identification information acquiring part 202. It is to be noted that, as described above, the transmission of the arrival station identification information from the information transmission device 200 is continued until when the train 210 departs from the arrival station 400. Here, when the departure of the train 210 may be set, as described above, to a point of time at which closing of the door of the train 210 is detected after the door is opened at the arrival station 400. The communication module 201 receives the arrival station identification information containing the train identification information indicating the next approaching station 400 transmitted from the traffic control system 100. This allows the arrival station identification information transmission part 204 to transmit the next arrival station identification information acquired by the arrival station identification information acquiring part 202.

Next, a description will be made to an information providing processing with reference to FIG. 7. It is to be noted that the following description will be made on the assumption that the detraining station setting receiving part 317b of the public transportation boarding and alighting support part 317 of the mobile terminal 300 has already received the setting of the destination detraining station and held as the destination station identification information.

The user gets on the train 210 at any station 400. At this time, the mobile terminal 300 of the user enters the transmission area A of the area information continuously transmitted from the area information transmission part 205 of the information transmission device 200 in the train 210.

(Step S121)

Herein, the boarding and alighting guidance control part 317f of the public transportation boarding and alighting support part 317 determines whether or not the area information acquiring part 17c acquires the area information continuously transmitted from the information transmission device 200. If the area information is not acquired (Step S121: No), the program comes into a waiting state for acquisition of the area information. Otherwise, if the area information is acquired (Step S121: Yes), the process proceeds to Step S122.

(Step S122)

If the area information acquiring part 317c acquires the area information continuously transmitted from the information transmission device 200, the boarding and alighting guidance control part 317f of the traffic boarding and alighting support part 317 determines whether or not the detraining station setting receiving part 317b has already received the setting of the destination detraining station. If the destination detraining setting receiving part 317b of the public transportation boarding and alighting support part 317 has not yet received the setting of the destination detraining station (Step S122: No), the boarding and alighting guidance control part 317f terminates the subsequent processes. Otherwise, if the destination detraining station setting receiving part 317b of the public transportation boarding and alighting support part 317 has already received the setting of the destination detraining station (Step S122: Yes), the process proceeds to Step S123.

(Step S123)

If the destination detraining station setting receiving part 317b of the boarding and alighting guidance control part 317f determines that the destination detraining station setting receiving part 317b of the traffic boarding and alighting support part 317 has already received the setting of the destination detraining station, the boarding and alighting guidance control part 317f determines whether or not the arrival station identification information acquiring part 317d of the public transportation boarding and alighting assistant control part 317 acquires the arrival station identification information transmitted from the information transmission device 200. If the arrival station identification information acquiring part 317d does not acquire the arriving part identification information (Step S123: No), the process comes into a waiting state for acquisition of the arrival station identification information. Otherwise, if the arrival station identification information acquiring part 317d acquires the arrival station identification information (Step S123: Yes), the process proceeds to Step S124.

(Step S124)

Next, the arrival station identification comparison part 317e of the public transportation boarding and alighting support part 317 compares the arrival station identification information acquired by the arrival station identification information acquiring part 317d of the public transportation boarding and alighting support part 317 with the destination station identification information held by the detraining station setting receiving part 317b of the public transportation boarding and alighting support part 317.

(Step S125)

Then, the boarding and alighting guidance control part 317f determines whether or not the comparison result obtained by the arrival station identification comparison part 317e. If the comparison result is matched with each other (Step S125: Yes), the process proceeds to Step 126. Otherwise, if the comparison result does not match with each other (Step S125: No), the process proceeds to Step 129.

(Step S126)

If the comparison result obtained by the arrival station identification comparison part 317e is matched with each other (Step S125: Yes), the boarding and alighting guidance control part 317f notifies the comparison result depending on the user's setting, through anyone of or any combination of the speaker 330, the vibrator 331, and the display part 332. In other words, in a case where the speaker 330 is selected, the speaker 330 notifies that the train 210 is approaching the destination detraining station by a voice. Further, in a case where the vibrator 331 is selected, the vibrator 331 notifies that the train 210 is approaching the destination detraining station by vibrations. Furthermore, in a case where the display part 332 is selected, the display 332 notifies that the train 210 is approaching the destination detraining station by characters or images.

(Step S127)

Next, the boarding and alighting guidance control part 317f determines whether or not the area information acquiring part 317c ceases to acquire the area information continuously transmitted from the information transmission device 200 within the specified period. If the area information acquiring part 317c acquires the area information even after elapse of the specified period (Step S127: No), the process proceeds to step S132. Otherwise, if the area information acquiring part 317c ceases to acquire the area information before the elapse of the specified period (Step S127: Yes), the process proceeds to step S128.

(Step S123)

More specifically, when the user gets off the train 210 arrived at the detraining station, the mobile terminal 300 goes out of the transmission area A shown in FIG. 1. Then, the area information acquiring part 317c ceases to acquire the area information transmitted from the information transmission device 200. In this case, if the area information acquiring part 317c ceases to acquire the area information after the comparison result obtained by the arrival station identification information comparison part 317e is matched with each other, the boarding and alighting guidance control part 317*f* can determine that the user has got off at the destination detraining station.

(Step S128)

After that, the boarding and alighting guidance control part 317*f* cancels the holding of the destination station identification information by the detraining station setting receiving part 317*b,* and then closes the boarding and alighting guidance application. Thereby, even when the user gets on the train 210 of another routes, a warning is not issued as the setting of the destination detraining station has been cancelled.

(Step S129)

Otherwise, if the comparison result obtained by the arrival station identification comparison part 317*e* in Step S125 does not match with each other, the boarding and alighting guidance control part 317*f* determines whether or not the area information acquiring part 317*c* ceases to acquire the area information continuously transmitted from the information transmission device 200. If the area information acquiring part 317*c* ceases to acquire the area information transmitted from the information transmission device 200 (Step S129: Yes), the process proceeds to Step S130. Otherwise, if the area information acquiring part 317*c* acquires the area information transmitted from the information transmission device 200 (Step S129: No), the process proceeds to Step S123.

More specifically, that the comparison result obtained by the arrival station identification information comparison part 317*e* does not match with each other, and that the area information acquiring part 317*e* acquires the area information transmitted from the information transmission part 200 mean that the user is in the train 210. In other words, the train 210 has not yet reached the destination detraining station.

Further, if the user gets off the train 210 before the comparison result obtained by the arrival station identification comparison part 317*e* does not match with each other in Step S125, the mobile terminal 300 goes out of the transmission area A shown in FIG. 1. For this reason, the area information acquiring part 317*c* ceases to acquire the area information transmitted from the information transmission device 200. In this way, when the comparison result obtained by the arrival station identification comparison part 317*e* does not match with each other, if the area information acquiring part 317*c* ceases to acquire the area information transmitted from the information transmission device 200, it means that the user has got off at the station before the detraining station.

(Step S130)

If the user gets off at the station before the destination detraining station, a warning indicating that the user gets off at the station before the destination detraining station is displayed on the display part 332 or issues a warning indicating the same by a voice from speaker 330.

(Step S131)

Further, the boarding and alighting guidance control part 317*f* reads the route maps of various routes and the identification information of each of the station 400, and the like stored in the boarding and alighting guidance storage part 317*a*. Then, the boarding and alighting guidance control part 317*f* displays the transfer guidance on the display part 332 until the user reaches the detraining station. Alternatively, the transfer guidance may be provided by a voice from the speaker 330. This enables the user to confirm the transfer guidance before going out of the ticket gate of the station other than the destination detraining station, which allows the user to take an immediate action following the transfer guidance.

Meanwhile, that the area information acquiring part 317*c* acquires the area information transmitted from the information transmission device 200 in step S127 (step S127: No) after the comparison result obtained by the arrival station identification information comparison part 317*e* is matched with each other in step S125 mean that the user failed to get off at the destination detraining station. In this connection, as described above, the determination made in (Step S127: No) is continued until the train 210 departs from the station 400 at which the train 210 is arrived. Thus, the determination may be made after the destination detraining station identification information acquiring part 317*d* ceases to acquire the destination detraining station identification information transmitted from the information transmission part 200. This surely confirms that the user failed to get off at the destination detraining station.

(Step S132)

Then, if the user failed to get off at the destination detraining station, the boarding and alighting guidance control part 317*f* displays a warning indicating that the user failed to get off at the destination detraining station on the display part 332 or issues a warning indicating the same by a voice from the speaker 330.

(Step S133)

Further, the boarding and alighting guidance control part 317*f* of the public transportation boarding and alighting support part 317 reads the route maps of various routes and the identification information of each of the station 400, and the like stored in the boarding and alighting guidance storage part 317*a*. Then, the boarding and alighting assistant part 317*f* displays the transfer guidance on the display part 332 until the user reaches the destination detraining station. Alternatively, as above, the transfer guidance may be provided by a voice from the speaker. This enables the user to confirm the transfer guidance before going out of the ticket gate of the station other than the destination detraining station, which allows the user to take an immediate action following the transfer guidance.

As described above, in the present exemplary embodiment, the area information acquiring part 317*c* acquires the area information which is available only in the train and continuously transmitted from the information transmission device 200 arranged in the public transportation. Further, the arrival station identification information acquiring part 317*d* acquires the arrival station identification information transmitted within the specified period. Then, the arrival station identification information comparison part 317*e* compares the arrival station identification information with the destination station identification information held in the detraining station guidance storage part 317*b*. By doing so, if the comparison result obtained by the arrival station identification information comparison part 317*e* is matched with each other, the boarding and alighting guidance control part 317*f* can notify that the train is approaching the detraining station.

Thus, according to the present exemplary embodiment, it is possible to determine whether or not the train is approaching the detraining station by acquiring the area information which is available only in the train and continuously transmitted from the information transmission device 200 arranged in the public transportation, and the arrival station identification information transmitted within the specified period. This eliminates the necessity for the user management, which simplifies the system configurations associated with the user management and boarding and alighting guidance for the user.

Further, according to the present exemplary embodiment, if the comparison result obtained by the arrival station identification information comparison part 317e does not match with each other and if the area information acquiring part 317c ceases to acquire the area information, the boarding and alighting guidance control part 317f determines that the user gets off at the station other than the destination detraining station and can issue a warning. This notifies the user that the user has got off at the station other than the destination detraining station.

It is to be noted that while the present exemplary embodiment is described in terms of the public transportation by taking the railroad as an example, not necessarily limited to this embodiment, the present disclosure may be applicable to other public transportation including, for example, a bus.

What is claimed is:

1. A non-transitory computer-readable recording medium in which an information providing program is stored for causing a computer to control a mobile terminal, the information providing program causing the computer to operate as:
   a detraining station setting receiving circuit that receives an inputted setting of a destination detraining station and holds the setting as destination station identification information;
   an area information acquiring circuit that acquires area information which is continuously transmitted from an information transmission device arranged in public transportation and available only in a train;
   an arrival station identification information acquiring circuit that acquires arrival station identification information transmitted from the information transmission device within a specified period;
   an arrival station identification information comparing circuit that compares the arrival station identification information with the destination station identification information; and
   a boarding and alighting guidance control circuit that notifies that the train is approaching a detraining station when a comparison result obtained by the arrival station identification information comparing circuit is matched with each other,
   wherein when the comparison result obtained by the arrival station identification information comparing circuit does not match with each other, and the area information acquiring circuit ceases to acquire the area information, the boarding and alighting control circuit determines that a user gets off at a station other than the destination detraining station and issues a warning.

2. The non-transitory computer-readable recording medium according to claim 1, wherein the boarding and alighting guidance control circuit determines that the user gets off at the station before the destination detraining station and issues the warning when the area information acquiring circuit ceases to acquire the area information before the comparison result obtained by the arrival station identification information comparing circuit is matched with each other.

3. The non-transitory computer-readable recording medium according to claim 1, wherein the boarding and alighting guidance control circuit determines that the user failed to get off at the destination detraining station when the area information acquiring circuit acquired the area information even after the specified period has elapsed after the comparison result obtained by the arrival station identification information comparing circuit is matched with each other.

4. The non-transitory computer-readable recording medium according to claim 1, wherein the boarding and alighting guidance control circuit reads route maps of various routes and identification information of each of the station stored in the boarding and alighting guidance storage part and outputs transfer guidance until the user arrives at the destination detraining station.

5. The non-transitory computer-readable recording medium according to claim 1, wherein the boarding and alighting guidance control circuit cancels the holding of the destination station identification information by the detraining station setting receiving circuit when the area information acquiring circuit ceases to acquire the area information until the specified period has elapsed after the comparison result obtained by the arrival station identification information comparing circuit is matched with each other.

6. The non-transitory computer-readable recording medium according to claim 1, wherein the specified period is a time interval between a time when the train approaches the arrival station and a time when the train departs from the arrival station.

7. A boarding and alighting guidance system comprising:
   a traffic control system that is arranged at a remote position distant from a station;
   an information transmission device that is arranged in a train and receives information from the traffic control system; and
   a mobile terminal that receives information from the information transmission device,
   the traffic control system including an arrival station identification information transmission control circuit that confirms an operation status of the train and transmits arrival station identification information containing train identification information for identifying an arrival station to the information transmission device when the train approaches the station,
   the information transmission device including an arrival station identification information transmission circuit that transmits the arrival station identification information within a specified period and an area information transmission circuit that continuously transmits area information which is available only in the train, and
   the mobile terminal including a detraining station setting receiving circuit that receives a destination detraining station and holds the setting as destination station identification information, an area information acquiring circuit that acquires the area information, an arrival station identification information acquiring circuit that acquires the arrival station identification information, an arrival station identification information comparison circuit that compares the arrival station identification information with the destination station identification information, and a boarding and alighting guidance control circuit that notifies that the train is approaching the destination detraining station when a comparison obtained by the arrival station identification information comparison circuit is matched with each other,
   wherein the boarding and alighting guidance control circuit determines that the user gets off at a station other than the destination detraining station and issues a warning when the comparison result obtained by the arrival station identification information comparison circuit does not match with each other, and when the area information acquiring circuit ceases to acquire the area information.

* * * * *